Patented Jan. 29, 1929.

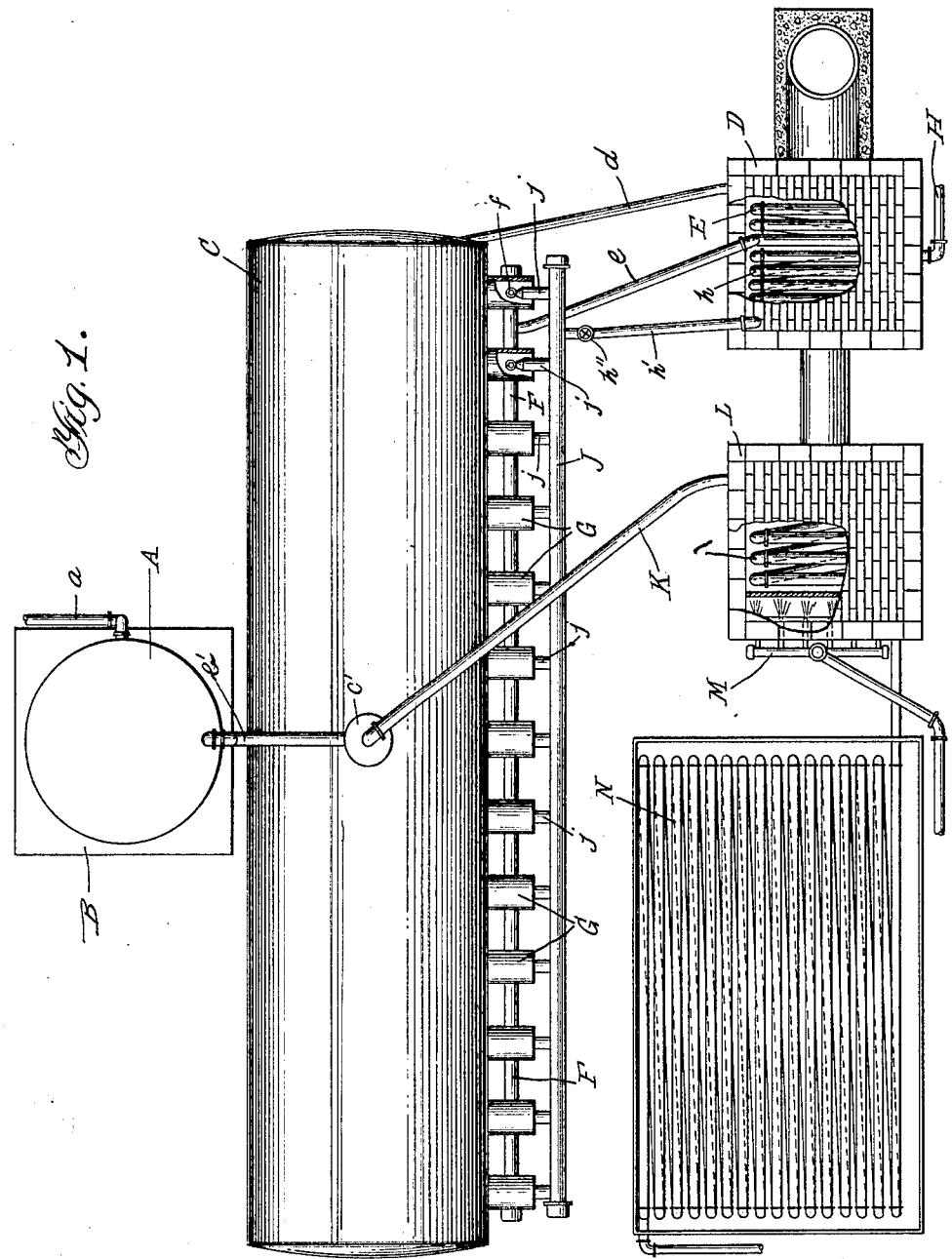

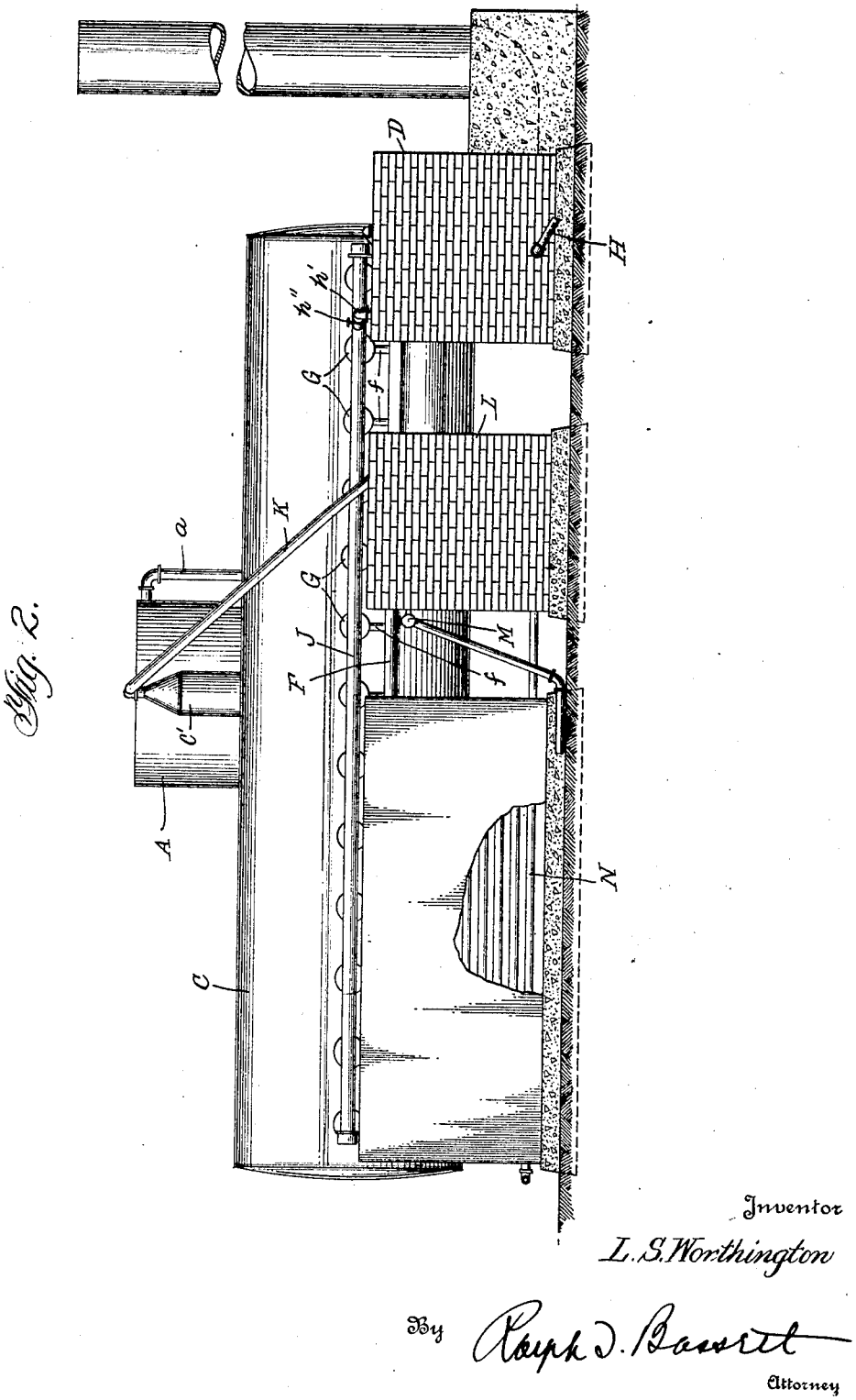

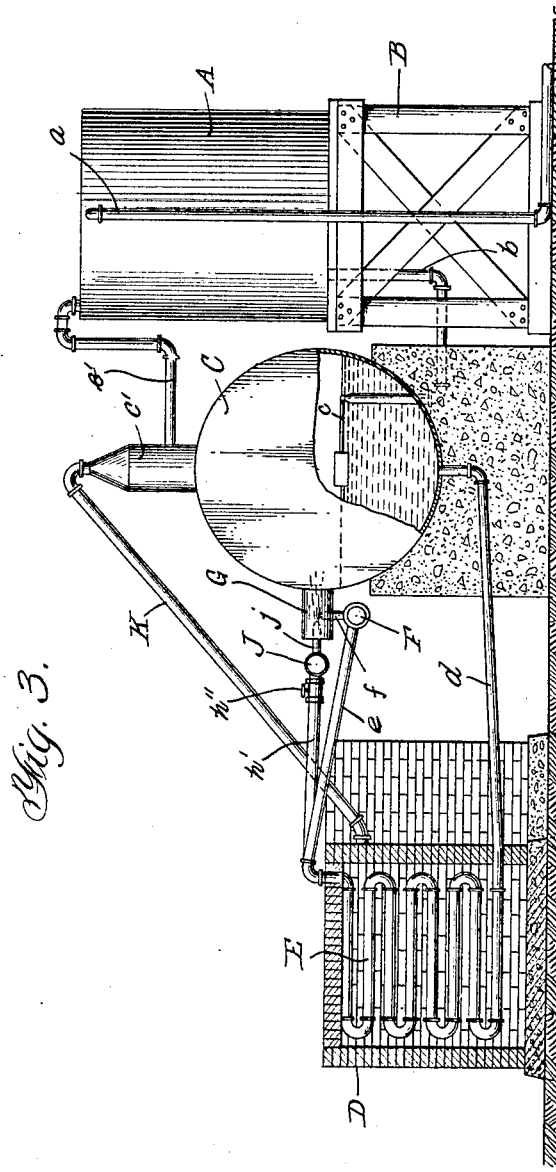

1,700,556

UNITED STATES PATENT OFFICE.

LESTER S. WORTHINGTON, OF CASPER, WYOMING, ASSIGNOR TO C. L. THOMPSON, OF CASPER, WYOMING.

APPARATUS FOR COMBINING NATURAL GAS AND HYDROCARBON OIL FOR THE PRODUCTION OF GASOLINE.

Application filed January 22, 1924. Serial No. 687,797.

This invention relates to an apparatus designed to bring about the combination of natural gas and hydrocarbon oil for the purpose of producing gasoline.

The main object of this invention is to provide a construction and arrangement capable of regulation as to temperature and pressure for the purpose of permitting the comingling of certain desired gases and vapors for ultimate condensation into gasoline of desired quality.

More specifically the present idea involves an apparatus including a storage tank for the liquid hydrocarbon, an auxiliary feeding tank and mixing chamber communicating with the storage tank, a control valve for regulating the level of liquid in the mixing chamber, heating units for the treatment of the oil from the auxiliary feeding tank and simultaneous treatment of gas, spray jets communicating with the auxiliary feeding tank and connected to the heating units, auxiliary heating units for the mixed vapors from the spray jets and condensing means for the vapors from the auxiliary heating unit.

The present apparatus is more fully set forth by the annexed drawings forming a part of this specification and wherein the various parts are referred to by like reference characters throughout the several views, in which:

Figure 1 is a top plan view, parts being broken away in section;

Figure 2 is a side elevation in which the wall of the condenser chamber is broken away, and Figure 3 is an end view showing the main heating unit in section and parts being broken away to show the arrangement of the control valve in the feeding tank.

The storage tank A is shown elevated on a suitable platform B for the purpose of providing suitable pressure for feeding the hydro-carbon oil to the feeding chamber C. The hydro-carbon oil is supplied to the storage tank A through the feed pipe $a$ which enters such tank at a point near its top. From the tank A this hydro-carbon oil passes to the auxiliary feeding tank or mixing chamber C through the pipe $b$ which pipe terminates at one end at the bottom of the tank A and at the other end projects upwardly through the bottom of the feed chamber C to a point approximately its center and is provided at the latter terminal with a float controlled valve $c$. By this arrangement, the level of the liquid in the chamber C is constant and the feed is automatic. To maintain equal pressure in the chamber C and the tank A, a pipe $b'$ connects the dome $c'$ of the chamber C with the top of the supply tank A.

A heating unit or retort D is located near the tank C, the heat being produced by any suitable means and the liquid hydro-carbon oil is fed from the chamber C by means of pipe $d$ to a suitable coil E in said heating unit where after proper firing, it is conveyed through the pipe $e$ to the distributing pipe F. A series of atomizing or jet manifolds G radiate from the side of the feeding chamber C and comprise equally spaced cylindrical bodies which communicate at their inner end within the said chamber C. Into each of these manifolds G a nozzle $f$ projects from the distributing pipe F located therebelow and these nozzles terminate at a point substantially the center of each manifold G.

A pipe H connected to a suitable source of gas supply extends into the heating unit D and connects to the heating coil $h$ and from this coil the gas, after being heated to a proper temperature is conducted to the distributing pipe J through the pipe $h'$. A valve $h''$ is arranged in the pipe $h'$ for the regulation of the pressure of the gas passing therethrough. The distributing pipe J which is located to extend in a plane at substantially the center of the row of manifolds G has a series of jets $j$ which terminate outwardly of the jets $f$ and directly above the latter.

Obviously, from the foregoing arrangement, note particularly Figure 3, the heated gas entering through the jets $j$ from the coil $h$ in the heating unit D will co-mingle with the spray of heated oil entering through the jets $f$ from the heating coil E. As this mixture is sprayed through the manifolds G into the chamber C the vapors will escape through the discharge pipe K and the liquid will settle in the chamber C for further treatment.

The vapors escaping through the discharge pipe K pass into the heating unit L through the coiled pipe *l* where they are subjected to the heat from the burner M and from this coil *l* they pass into the condenser N which may be of conventional type.

A more satisfactory understanding of the application of the foregoing apparatus to the oil industry may be obtained by knowledge of the fact that it has been found that when hydro-carbon oils are sprayed with and in the presence of natural gas or other hydrocarbon gases (for instance still head gas) and passed together for a period of time at a temperature between normal and the cracking temperature of the oil used, that on passing through a condenser or absorber, or other suitable recovery system as now utilized in the art, that liquid hydro-carbons are recovered differing from the crude materials used. To one skilled in the art, it will be obvious that conditions may be so regulated, as by change of materials, temperatures, pressures and their ratio one to the other and the like, that a substantial amount of product may be produced in this manner which product is of such a nature that same may be marketed as liquid motor fuel of the gasoline type.

It will also be obvious to one familiar with the art that various modifications in temperatures, pressures and other features of the present invention will vary in accordance with the nature of the material being treated or according to the nature of the product desired.

It will also be seen that numerous changes may be made in the details of construction and arrangement of parts without departing from the spirit of the invention.

What I claim as new and useful and desire to secure by Letters Patent, is:—

1. In an apparatus of the class described, the combination of an oil supply tank, a feeding and treating chamber, means for feeding oil from the supply tank to the feeding and treating chamber, regulating means for said oil supply, a furnace, heating coils in said furnace, means for supplying oil from said feeding tank to one of said coils, a plurality of atomizing inlets communicating with said feeding and treating chamber, a pair of jet nozzles in each of said atomizing inlets, means for feeding oil from the last mentioned coil to one jet in each inlet, means for supplying gas to another coil in said furnace, means for feeding heated gas to the other of said jets in the inlet, a condenser and means for feeding the vapors generated in said inlets to said condenser.

2. In an apparatus of the class described, the combination of a tank adapted to contain hydrocarbons, means for continuously feeding liquid hydrocarbons into said tank, means for preventing said liquid hydrocarbons from rising above a predetermined level in said tank, a heating unit including a pair of heating coils, a pipe connecting said hydro-carbon tank with one of said heating coils, a source of gas supply connected to the other heating coil, a series of atomizing inlets to said tank, means for introducing the heated oil and gas from said coils into said atomizing inlets, and means for separating the vapors from the liquid escaping from said atomizing inlets.

3. In an apparatus of the class described, a feeding and treating chamber, means for feeding oil into said chamber, means actuated by the oil for preventing the oil in said chamber from rising beyond a predetermined level, whereby a vapor space may be maintained in the chamber above said level, an inlet for the chamber communicating with said vapor space, heating means, means for conveying oil from the chamber through said heating means and for spraying the same into said inlet, a gas conveying coil arranged in the heating means, a gas conducting pipe for conveying gas from said coil and for discharging the same into said inlet, a second heating means arranged exteriorly of the chamber, a conductor arranged in the last mentioned heating means, a pipe for conveying mixed vapors and gas from the upper portion of said chamber to said conductor, and a condenser operatively connected to said conductor.

4. In an apparatus of the class described, a combined feeding and treating chamber having an oil inlet, an oil outlet, a fluid mixture inlet, and a gas and vapor outlet, means cooperating with the oil inlet for preventing oil in the chamber from rising beyond a predetermined level so that the upper portion of the chamber may be utilized as a vapor space, heating means, a plurality of heating coils arranged in said heating means, a pipe connecting one of said coils to the oil outlet of the chamber, oil conveying means connecting the last mentioned coil to the fluid mixture inlet, means for feeding gas to another one of said coils, means for feeding the heated gas from the last mentioned coil to said inlet, a third heating coil, means connecting the last mentioned coil to the vapor and gas outlet of the chamber, and a condenser operatively connected to the last mentioned coil.

5. In an apparatus of the class described, a feeding and treating chamber, means for feeding oil to said chamber and for preventing at all times the oil in the chamber from rising above a certain elevation, means for passing the oil from the chamber back to the chamber and for heating it in said passage for vaporizing at least a portion of the same, means for atomizing the oil as it is discharged from the last mentioned means into the chamber, means for heating gas and for mixing the gas with the atomized oil as the latter is discharged into said chamber, means for discharging a mixture of gas and vapors from the upper portion of said chamber, and a condenser operatively connected to the last mentioned means.

6. In an apparatus of the class described, a supply tank, a combined feeding and mixing chamber, means for feeding oil from the tank to said chamber, means for controlling the supply of oil fed to said chamber for preventing oil in the chamber from rising above a certain elevation, an inlet to said chamber, a nozzle extending into the inlet, means for feeding oil from the chamber to said nozzle and for heating the oil in its passage to the nozzle, a second nozzle extending into the inlet and arranged to spray natural gas against the current of oil issuing from the first mentioned nozzle, means for feeding natural gas to the second nozzle, and means for condensing vapors evolved in the chamber.

7. An apparatus as claimed in claim 6 in which the upper portions of the tank and chamber communicate in order to equalize the pressure therein.

In testimony whereof I affix my signature.

LESTER S. WORTHINGTON.